(12) United States Patent  (10) Patent No.: US 9,028,601 B2
Denda et al.  (45) Date of Patent: May 12, 2015

(54) INK COMPOSITION AND PRINTED MATTER

(75) Inventors: Atsushi Denda, Chino (JP); Shiki Hirata, Shiojiri (JP); Tsuyoshi Sano, Shiojiri (JP)

(73) Assignee: Seiko Epson Corporation, Suwa-shi (JP)

( * ) Notice: Subject to any disclaimer, the term of this patent is extended or adjusted under 35 U.S.C. 154(b) by 15 days.

(21) Appl. No.: 13/365,592

(22) Filed: Feb. 3, 2012

(65) Prior Publication Data

US 2012/0202016 A1  Aug. 9, 2012

(30) Foreign Application Priority Data

Feb. 3, 2011 (JP) ................................. 2011-021714
Feb. 3, 2011 (JP) ................................. 2011-021715

(51) Int. Cl.
*C09D 11/02* (2014.01)
*C09D 11/322* (2014.01)
*C09D 11/38* (2014.01)

(52) U.S. Cl.
CPC .............. *C09D 11/322* (2013.01); *C09D 11/38* (2013.01)

(58) Field of Classification Search
USPC .......................... 106/31.92, 31.6, 31.69, 31.9
See application file for complete search history.

(56) References Cited

U.S. PATENT DOCUMENTS

| | | | |
|---|---|---|---|
| 2005/0215689 A1* | 9/2005 | Garbar et al. ................. | 524/440 |
| 2006/0240259 A1* | 10/2006 | Toyoda et al. ................ | 428/403 |
| 2007/0146454 A1* | 6/2007 | Doi et al. ...................... | 347/100 |
| 2008/0041269 A1* | 2/2008 | Bogale et al. ............... | 106/31.27 |
| 2008/0113098 A1 | 5/2008 | Toyoda et al. | |
| 2008/0257211 A1* | 10/2008 | Oriakhi ....................... | 106/31.65 |
| 2008/0277630 A1 | 11/2008 | Kiyoshima et al. | |
| 2009/0208651 A1 | 8/2009 | Oyanagi et al. | |
| 2010/0126379 A1* | 5/2010 | Tomura et al. ............. | 106/31.92 |
| 2011/0050786 A1 | 3/2011 | Toyoda et al. | |
| 2011/0281089 A1* | 11/2011 | Hirata et al. ................. | 428/209 |

FOREIGN PATENT DOCUMENTS

| | | |
|---|---|---|
| EP | 776952 A2 * | 6/1997 |
| JP | 2006-035205 A | 2/2006 |
| JP | 2007-297423 A | 11/2007 |
| JP | 2008-120863 A | 5/2008 |
| JP | 2008-527169 A | 7/2008 |
| JP | 2009-227736 A | 10/2009 |
| JP | 2009-256565 A | 11/2009 |
| WO | 2006/072959 A1 | 7/2006 |

* cited by examiner

*Primary Examiner* — Veronica F Faison
(74) *Attorney, Agent, or Firm* — Nutter McClennen & Fish LLP; John J. Penny, Jr.

(57) ABSTRACT

An ink composition of the invention is an ink composition to be ejected by an ink jet system and includes silver particles and water. When a composition A formed of components of the ink composition other than the water is held in an atmosphere at an ambient temperature of 23° C. and a relative humidity (RH) of 50%, the equilibrium moisture content of the component A is in a range of 2 to 7.8 percent by mass.

17 Claims, 1 Drawing Sheet

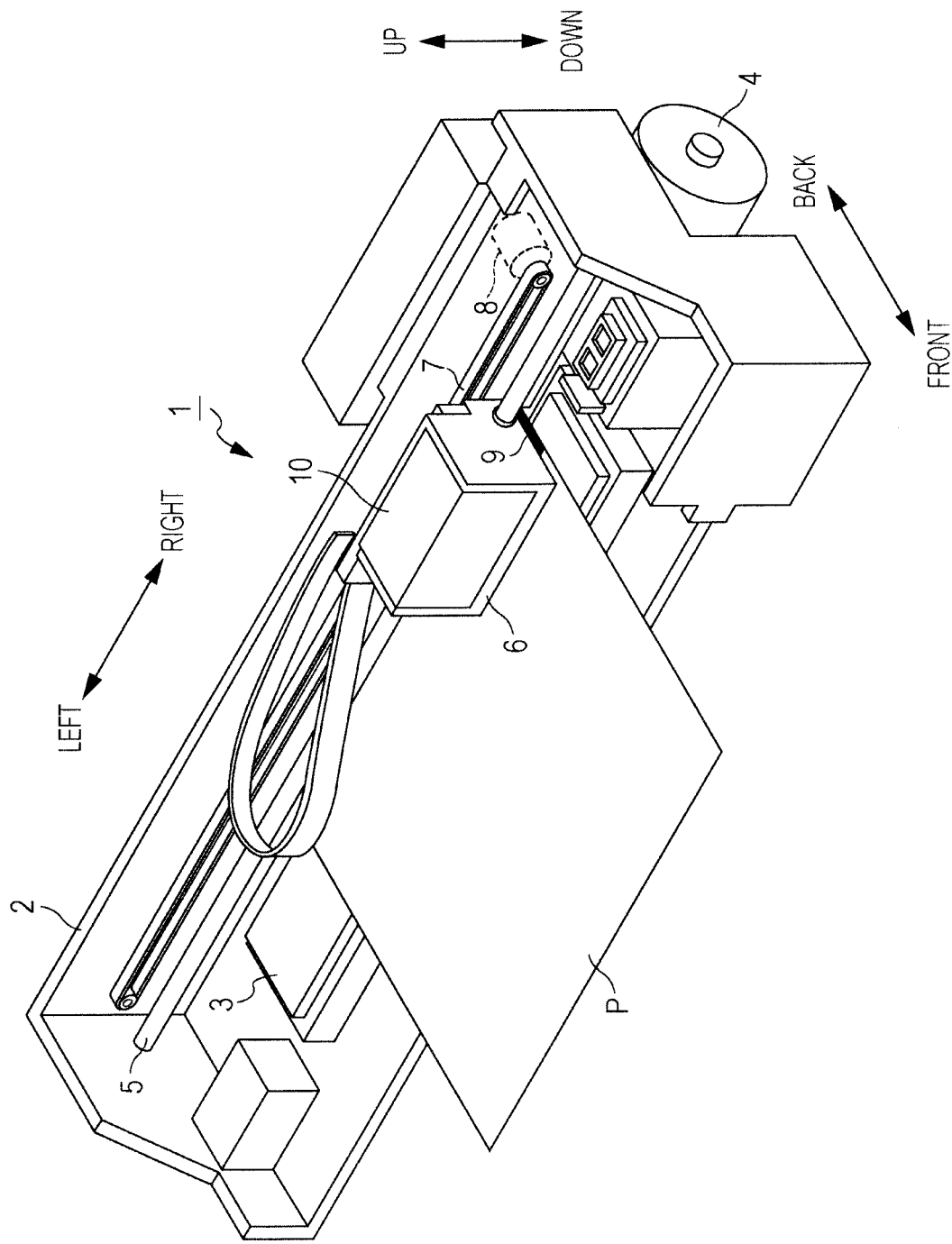

INK COMPOSITION AND PRINTED MATTER

Priority is claimed under 35 U.S.C. §119 to Japanese Application No. 2011-021714 filed on Feb. 3, 2011 and NO. 2011-021715 filed on Feb. 3, 2011, are hereby incorporated by reference in its entirety.

BACKGROUND

1. Technical Field

The present invention relates to an ink composition and printed matter.

2. Related Art

By generally using inks of cyan, magenta, yellow, and black as inks used for ink jet type printing, a so-called full color image is generally formed. In addition, in order to improve the quality of an image to be formed, the number of types of inks is increased (for example, six types of inks including inks of light magenta and light cyan besides the above four types of inks are used). However, even if the number of types of inks is increased as described above, metallic gloss cannot be disadvantageously expressed.

Hence, in recent years, an ink jet ink (metal ink) using metal particles has been proposed (for example, see JP-A-2007-297423). However, although relatively good metallic gloss can be obtained by the ink proposed in JP-A-2007-297423, it was difficult to stably eject this ink from an ink jet apparatus. In addition, there has also been a problem in that gas resistance of an image to be formed is inferior.

SUMMARY

An advantage of some aspects of the invention is to provide an ink composition which has an excellent ejection stability and which can easily form an image excellent in gas resistance and to provide printed matter having an image excellent in gas resistance.

Application 1

An ink composition to be ejected by an ink jet system comprises silver particles and water, and when a composition formed of components of the ink composition other than the water is held in an atmosphere at an ambient temperature of 23° C. and a relative humidity (RH) of 50%, the equilibrium moisture content of the composition is in a range of 2 to 7.8 percent by mass.

Application 2

In the ink composition according to Application 1, when the composition formed of components of the ink composition other than the water is held in an atmosphere at an ambient temperature of 23° C. and a relative humidity (RH) of 70%, the equilibrium moisture content of the composition is in a range of 4 to 15.9 percent by mass.

Application 3

In the ink composition according to Application 1 or 2, the mean particle diameter of the silver particles is in a range of 5 to 100 nm.

Application 4

In the ink composition according to one of Applications 1 to 3, the silver particles do not contain 0.1 percent by mass or more of particles having a particle diameter of 150 nm or more on a volume basis.

Application 5

The ink composition according to one of Applications 1 to 4, further comprises a saccharide.

Application 6

The ink composition according to one of Applications 1 to 5, further comprises a plurality of types of saccharides.

Application 7

In the ink composition according to Application 6, the plurality of types of saccharides contains 45% or less of a monosaccharide and 10% or more of at least one of a tetrasaccharide and a higher saccharide.

Application 8

An ink composition to be ejected by an ink jet system comprises silver particles and a saccharide.

Application 9

The ink composition according to Application 8 includes a plurality of types of saccharides.

Application 10

In the ink composition according to Application 8 or 9, the saccharide includes at least one of a tetrasaccharide and a higher saccharide.

Application 11

In the ink composition according to Application 9, the plurality of types of saccharides includes a monosaccharide and at least one of a disaccharide and a higher saccharide.

Application 12

In the ink composition according to Application 9, the plurality of types of saccharides includes a monosaccharide and at least one of a tetrasaccharide and a higher saccharide.

Application 13

In the ink composition according to Application 12, the content of the monosaccharide is 45 percent by mass or less and the content of the at least one of a tetrasaccharide and a higher saccharide is 10 percent by mass or more.

Application 14

In the ink composition according to one of Applications 8 to 13, the content of the saccharide is 5 percent by mass or more.

Application 15

In the ink composition according to one of Applications 8 to 14, the saccharide includes a tetrasaccharide of a trehalose derivative.

Application 16

In the ink composition according to Application 15, the saccharide includes maltosyltrehalose.

Application 17

A printing apparatus which applies the ink composition according to one of Applications 1 to 16 on a print medium by an ink jet system.

Application 18

Printed matter which is obtained by applying the ink composition according to one of Applications 1 to 16 on a print medium by an ink jet system.

BRIEF DESCRIPTION OF THE DRAWING

The invention will be described with reference to the accompanying drawing, wherein like numbers reference like elements.

The FIGURE is a perspective view showing a schematic structure of an ink jet apparatus.

DESCRIPTION OF EXEMPLARY EMBODIMENTS

Hereinafter, a first preferable embodiment of the invention will be described in detail.

Ink Composition

An ink composition of the invention is to be ejected by an ink jet system. The ink composition of the invention at least includes silver particles and water. Incidentally, heretofore, an ink jet ink using metal particles has been known. However, although relatively good metallic gloss can be obtained by a related ink, it has been difficult to stably eject this ink from an ink jet apparatus. In addition, there has been a problem in that an image to be formed has an inferior gas resistance.

Hence, through intensive research carried out in consideration of the problems as described above, the inventors found that in an ink composition which includes silver particles and water, when a composition A formed of components of the ink composition other than the water is configured to have an equilibrium moisture content in a range of 2 to 7.8 percent by mass after being held in an atmosphere at an ambient temperature of 23° C. and a relative humidity (RH) of 50%, the above problems can be solved, and as a result, the invention was finally made. That is, the ink composition of the invention includes silver particles and water, and the composition A has an equivalent moisture content in a range of 2 to 7.8 percent by mass when being held in an atmosphere at an ambient temperature of 23° C. and a relative humidity (RH) of 50%; hence, the ink composition of the invention has an excellent ejection stability and can easily form an image having an excellent gas resistance.

On the other hand, when the equilibrium moisture content of the composition A under the above conditions is less than the lower limit, the moisture retention of the whole ink composition is degraded, and as a result, a sufficient ejection stability cannot be obtained. On the other hand, when the equilibrium moisture content of the composition A under the above conditions is more than the upper limit, the gas resistance of an image to be formed is degraded. The reason for this is that since water absorbability of the image to be formed is increased, and silver contained therein is changed into ions and is liable to perform a chemical reaction, the gas resistance is degraded.

As described above, in the invention, although the equilibrium moisture content of the composition A under the above conditions is in a range of 2 to 7.8 percent by mass, the equilibrium moisture content of the composition A under the above conditions is preferably in a range of 2 to 6.1 percent by mass. As a result, the effect of the invention can be made more significant. In addition, when the composition A is held in an atmosphere at an ambient temperature of 23° C. and a humidity RH of 70%, the equilibrium moisture content of the composition A is preferably in a range of 4 to 15.9 percent by mass and more preferably in a range of 4 to 12.4 percent by mass. Accordingly, the ink composition has a more excellent ejection stability and also can more easily form an image having an excellent gas resistance. In addition, the composition A may be obtained by mixing components other than water or may be obtained by removing water from the ink composition by heating or the like.

Hereinafter, the individual components will be described in detail.

Silver Particles

As described above, the ink composition according to the invention is a composition including silver particles. Since the ink composition includes silver particles, an image having a particularly excellent glitter (metallic gloss) can be formed. In addition, since silver has a high degree of whiteness among various metals, when this ink composition is overlapped with an ink having a different color, various metal colors, such as gold and copper, can be obtained.

The mean particle diameter of the silver particles is preferably in a range of 5 to 100 nm and more preferably in a range of 20 to 65 nm. Accordingly, the ejection stability (accuracy of position of ink landed on a medium, stability of an ejection amount, and the like) of the ink composition by an ink jet system can be made particularly excellent, and an image having a desired quality can be more reliably formed over a long period of time. In addition, glossy feeling (high-grade feeling) of an image to be formed using the ink composition can be significantly improved, and also a rub resistance can be further improved. In this specification, the "mean particle diameter" indicates the mean particle diameter on a volume basis, unless otherwise particularly noted. In addition, the silver particles preferably do not contain 0.1 percent by mass or more of particles having a particle diameter of 150 nm or more on a volume basis. Accordingly, the ejection stability (accuracy of position of ink landed on a medium, stability of an ejection amount, and the like) of the ink composition by an ink jet system and the prevention of precipitation of silver particles can be made particularly excellent.

In addition, the mean particle diameter d90 in a grain size accumulation curve of the silver particles is preferably in a range of 10 to 100 nm. Hence, the glitter of an image to be formed using the ink composition can be made particularly excellent. In addition, the ejection stability (accuracy of position of ink landed on a medium, stability of an ejection amount, and the like) of the ink composition by an ink jet system can be made particularly excellent, and an image having a desired quality can be more reliably formed over a long period of time.

In addition, the mean particle diameter d90 in the grain size accumulation curve of the silver particles is preferably in a range of 2 to 20 nm. Accordingly, the glitter of an image to be formed using the ink composition can be significantly improved. In addition, the ejection stability (accuracy of position of ink landed on a medium, stability of an ejection amount, and the like) of the ink composition by an ink jet system can be made particularly excellent, and an image having a desired quality can be more reliably formed over a long period of time.

The content of the silver particles in the ink composition is preferably in a range of 0.5 to 30 percent by mass and more preferably in a range of 3.0 to 15 percent by mass. Hence, the ejection stability of the ink composition by an ink jet system and the storage stability of the ink composition can be made particularly excellent. In addition, in a wide range of from a low to a high density (content per unit area) of the silver particles on a print medium formed as the printed matter, excellent image quality and rub resistance can be realized. Accordingly, for example, even if printed matter obtained using the ink composition has regions in which the densities of the silver particles are different from each other, the image quality of the printed matter can be made excellent. The silver particles may be prepared by using any method, and for example, when a solution containing silver ions is prepared, and the silver ions are reduced, the silver particles can be preferably formed.

Water

The ink composition according to the invention includes water. In the ink composition, the water primarily functions as a dispersion medium to disperse the silver particles. Since the ink composition includes water, for example, dispersion stability of the silver particles and the like can be made excellent, and in addition, while the ink composition in the vicinity of a nozzle of a liquid droplet ejecting apparatus as described below is prevented from being unfavorably dried (evaporation of the dispersion medium), since drying can be rapidly performed on a print medium to which the ink composition is applied, high-speed printing of a desired image can be preferably performed over a long period of time. Although being not particularly limited, the content of the water in the ink composition is preferably in a range of 20 to 80 percent by mass and more preferably in a range of 25 to 70 percent by mass.

Saccharide

The ink composition of the invention may also includes a saccharide. Since the ink composition includes a saccharide, the ink composition in the vicinity of a nozzle of a liquid droplet ejecting apparatus as described below is prevented from being unfavorably dried (evaporation of the dispersion medium), and hence the ejection stability can be made particularly excellent. As the saccharide, for example, a monosaccharide and a polysaccharide may be mentioned, and in particular, for example, there may be mentioned glucose, ribose, mannitol, mannose, fructose, xylose, arabinose, galactose, aldonic acid, glucitol (sorbitol), maltose, cellobiose, lactose, sucrose, trehalose, and maltotriose. In this embodiment, the polysaccharide means a saccharide in a broad sense and includes substances, such as alginic acid, α-cyclodextrin, and cellulose, which are widely present in the natural world. In addition, as derivatives of these saccharides mentioned above, for example, a reduced sugar of the saccharide described above (such as a sugar alcohol (represented by general formula $HOCH_2(CHOH)_nCH_2OH$ (where n indicates an integer of 2 to 5), an oxidized sugar (such as aldonic acid or uronic acid), an amino acid, and a thiosugar may be mentioned.

In addition, a plurality of types of saccharides may be included as the saccharide. In this case, a monosaccharide and at least one of a disaccharide and a higher saccharide are preferably included, and a monosaccharide and at least one of a tetrasaccharide and a higher saccharide are more preferably included. Accordingly, unfavorable drying of ink in the ejection thereof can be suppressed, and the ejection stability can be made particularly excellent. In addition, the gas resistance of an image to be formed can be made more excellent. As a mixed saccharide including a plurality of types of saccharides as described above, for example, reduction starch sugar products, such as HS-20, HS-30, HS-40, HS-60, HS-300, and HS-500 (trade names of Hayashibara Co., Ltd.), and HALLODEX and MABIT (trade names of Hayashibara Co., Ltd.) may be mentioned.

In addition, when a plurality of types of saccharides is included, a saccharide having a composition containing 45 percent by mass or less of a monosaccharide and 10 percent by mass or more of at least one of a tetrasaccharide and a higher saccharide is preferable, and a saccharide having a composition containing 15 percent by mass or less of a monosaccharide and 40 percent by mass or more of at least one of a tetrasaccharide and a higher saccharide is more preferable. When the saccharide satisfies the above composition, the hygroscopic property can be decreased, and the gas resistance of an image to be formed can be made particularly excellent. In addition, unfavorable drying of ink in the ejection thereof can be suppressed, and the ejection stability can be made particularly excellent. In addition, although a tetrasaccharide and a higher saccharide are not particularly limited, a trehalose derivative is preferable, and maltosyltrehalose is more preferable. Although being not particularly limited, the content of the saccharide is preferably in a range of 1 to 20 percent by mass.

Polyalcohol

The ink composition of the invention may also include a polyalcohol besides the components described above. When the ink composition of the invention is applied to an ink jet type recording apparatus, the polyalcohol can suppress drying of the ink and can prevent clogging of an ink jet type recording head portion caused by the ink.

As the polyalcohol, for example, there may be mentioned ethylene glycol, diethylene glycol, triethylene glycol, polyethylene glycol, polypropylene glycol, propylene glycol, butylene glycol, 1,2,6-hexanetriol, thioglycol, hexylene glycol, glycerol, trimethylolethane, trimethylolpropane, 1,2-butanediol, 1,2-pentanediol, 1,2-hexanediol, 1,2-heptanediol, and 1,2-octanediol. Among those mentioned above, an alkanediol having 4 to 8 carbon atoms is preferable, and an alkanediol having 6 to 8 carbon atoms is more preferable. In addition, among the above polyalcohols, an ink composition including 1,2-hexanediol and/or trimethylolpropane is preferable. Accordingly, while the dispersion stability of the silver particles in the ink composition and the storage stability of the ink can both be made particularly excellent, the ejection stability thereof can also be made particularly excellent. Although being not particularly limited, the content of the polyalcohol in the ink composition is preferably in a range of 0.1 to 20 percent by mass and more preferably in a range of 0.5 to 10 percent by mass.

Glycol Ether

The ink composition of the invention may also include a glycol ether. When the glycol ether is included, the wettability to a recording surface of a print medium or the like can be improved, and the permeability of ink can be improved. As the glycol ether, for example, there may be mentioned lower alkyl ethers of polyalcohols, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether, and tripropylene glycol monomethyl ether. Among those mentioned above, when triethylene glycol monobutyl ether is used, a good recording quality can be obtained. Although being not particularly limited, the content of the glycol ether in the ink composition is preferably in a range of 0.2 to 20 percent by mass and more preferably in a range of 0.3 to 10 percent by mass.

Wax

The ink composition according to the invention may also include a wax. Accordingly, the rub resistance of an image to be formed can be made particularly excellent. The content of the wax in the ink composition is preferably in a range of 0.02 to 1.5 percent by mass, more preferably in a range of 0.04 to 1.0 percent by mass, and even more preferably in a range of 0.08 to 0.6 percent by mass.

Although resin waxes, such as a paraffin mixed wax, an oxidized high density polyethylene wax, a low density polyethylene wax, a polypropylene wax, a polyethylene-based mixed wax, a carnauba wax, and an amide wax, may be used as the wax, a wax formed of a paraffin mixed wax is preferable. Accordingly, the glossy feeling (metallic gloss) and the rub resistance of an image to be formed using the ink composition can be made particularly excellent. In addition, the ejection stability (accuracy of position of ink landed on a medium, stability of an ejection amount, and the like) of the ink composition by an ink jet system can be made particularly excellent, and an image having a desired quality can be more reliably formed over a long period of time.

As commercially available wax particle dispersion liquids (emulsion waxes), for example, there may be mentioned AQUACER 507 (manufactured by BYK-Chemie), AQUACER 515 (manufactured by BYK-Chemie), AQUACER 531 (manufactured by BYK-Chemie), AQUACER 537 (manufactured by BYK-Chemie), AQUACER 539 (manufactured by BYK-Chemie), CERAFLOUR 990 (manufactured by BYK-Chemie), and CERAFLOUR 995 (manufactured by BYK-Chemie).

Surfactant

The ink composition according to the invention preferably includes an acetylene glycol-based surfactant or a polysiloxane-based surfactant. The acetylene glycol-based surfactant or the polysiloxane-based surfactant can improve the wettability to a printing surface of a print medium or the like, and the permeability of the ink composition can be improved.

As the acetylene glycol-based surfactant, for example, 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol may be mentioned. In addition, as the acetylene glycol-based surfactant, a commercially available surfactant may also be used, and for example, Olfine E1010, STG, and Y (manufactured by Nissin Chemical Industry Co., Ltd.), Surfynol 104, 82, 465, 485, and TG (manufactured by Air Products and Chemicals Inc.) may be mentioned.

As the polysiloxane-based surfactant, a commercially available surfactant may also be used, and for example, BYK-347 and BYK-348 (manufactured by BYK-Chemie) may be mentioned. Furthermore, the ink composition according to the invention may also include another surfactant, such as an anionic surfactant, a nonionic surfactant, or an amphoteric surfactant. Although being not particularly limited, the content of the surfactant in the ink composition is preferably in a range of 0.01 to 5.0 percent by mass and more preferably in a range of 0.1 to 0.5 percent by mass.

Other Components

The ink composition of the invention may includes components (other components) other than those described above. As the components described above, for example, a pH adjustor, such as a potassium hydroxide solution, a penetrant, an organic binder, a urea compound, a drying inhibitor, such as an alkanolamine (such as triethanolamine), thiourea, an antiseptics, a head anti-rust agent, and a thickener may be mentioned.

When the ink composition includes a solid component (hereinafter, referred to as "the other solid component" in some cases) other than the silver particles, the content of the other solid component in the ink composition is preferably 5 percent by mass or less and more preferably 1 percent by mass or less. The content of the solid component in the ink composition is preferably 50 percent by mass or less, more preferably in a range of 3.6 to 40 percent by mass, and even more preferably in a range of 12 to 27 percent by mass. Accordingly, the ejection stability of the ink composition can be made particularly excellent.

In addition, although the viscosity (at 25° C. measured in accordance with JIS Z8809 using a vibration type viscometer) of the ink composition is not particularly limited, the viscosity is preferably in a range of 2.0 to 12.0 mPa·s and more preferably in a range of 3.0 to 10.0 mPa·s. Accordingly, while the ejection stability of droplets can be made excellent, an ink composition landed on a print medium can be more reliably prevented from being unfavorably spread, and even a fine image can be preferably formed.

Next, a second preferable embodiment of the invention will be described in detail.

The inventors found that the above problems can be solved by using an ink composition including silver particles and a saccharide, and the invention was finally made. That is, the ink composition of the invention has a feature of including silver particles and a saccharide, and hence besides an excellent ejection stability, an image having an excellent gas resistance can be easily formed. In particular, since the saccharide is included as described above, drying of ink in the vicinity of an ejection portion of the ink can be effectively suppressed, and clogging thereof can be prevented. In addition, since a saccharide having the composition as described above has a low hygroscopic property, in the image thus formed, silver is prevented from being ionized with moisture, and a chemical reaction between silver ions and a gas, such as oxygen or ozone, can be prevented. As a result, the gas resistance of the image can be made excellent.

Hereinafter, the individual components will be described in detail.

The ink composition of the invention includes silver particles as an essential component and also optionally includes water, a polyalcohol, a glycol ether, a wax, a surfactant, and others components. Details of the silver particles, the water, the polyalcohol, the glycol ether, the wax, the surfactant, and the other components are the same as those described above.

Saccharide

The ink composition of the invention includes a saccharide. Since including a saccharide, the ink composition in the vicinity of a nozzle of a liquid droplet ejecting apparatus as described below is prevented from being unfavorably dried (evaporation of a dispersion medium), and hence the ejection stability can be made particularly excellent. In addition, the gas resistance of an image to be formed can also be made excellent.

Although the type of saccharide is not particularly limited, a tetrasaccharide and/or a higher saccharide is more preferable, and since unfavorable drying (evaporation of a dispersion medium) of the ink composition can be suppressed, the ejection stability can be made particularly excellent. In addition, the gas resistance of an image to be formed can be made excellent. Furthermore, a plurality of types of saccharides is preferably included, a monosaccharide and at least one of a disaccharide and a higher saccharide are more preferably included, and a monosaccharide and at least one of a tetrasaccharide and a higher saccharide are most preferably included. When a monosaccharide and a at least one of tetrasaccharide and a higher saccharide are included, 45 percent by mass or less of a monosaccharide and 10 percent by mass or more of at least one of a tetrasaccharide and a higher saccharide are preferably included, and 7 percent by mass or less of a monosaccharide and 70 percent by mass or more of at least one of a tetrasaccharide and a higher saccharide are more preferably included.

As the saccharide, for example, a monosaccharide and a polysaccharide may be mentioned, and in particular, for example, glucose, ribose, mannitol, mannose, fructose, xylose, arabinose, galactose, aldonic acid, glucitol (sorbitol), maltose, cellobiose, lactose, sucrose, trehalose, and maltotriose may be mentioned. In this embodiment, the polysaccharide means a saccharide in a broad sense and includes substances, such as alginic acid, α-cyclodextrin, and cellulose, which are widely present in the natural world. In addition, as derivatives of these saccharides mentioned above, for example, a reduced sugar of the saccharide described above (such as a sugar alcohol (represented by general formula $HOCH_2(CHOH)_nCH_2OH$ (where n indicates an integer of 2 to 5), an oxidized sugar (such as aldonic acid or uronic acid), an amino acid, and a thiosugar may be mentioned. In addition, as the saccharide, a mixed saccharide containing a plurality of types of saccharides may also be used. As a commercially available mixed sugar (syrup), for example, reduction starch sugar products, such as HS-20, HS-30, HS-40, HS-60, HS-300, and HS-500 (trade names of Hayashibara Co., Ltd.), and HALLODEX and MABIT (trade names of Hayashibara Co., Ltd.) may be mentioned.

In addition, the saccharide included in the ink composition of the invention is preferably a trehalose derivative and a tetrasaccharide and more preferably contains maltosyltrehalose. Maltosyltrehalose is a non-reduced tetrasaccharide having maltose bonded to the hydroxyl group at the 4 position of trehalose, and since the component as described above is included in the ink composition, the hygroscopic property thereof can be significantly decreased, and the gas resistance of an image to be formed can be made particularly excellent. As the saccharide containing maltosyltrehalose as described above, for example, HALLODEX (trade name of Hayashibara Co., Ltd.) may be mentioned.

In addition, the content of the whole saccharide included in the ink composition of the invention is preferably 45 percent by mass or less, more preferably in a range of 2 to 25 percent by mass, even more preferably in a range of 5 to 20 percent by mass, and most preferably in a range of 5 to 15 percent by mass. Accordingly, while the ejection stability is made excellent, the gas resistance can be made particularly excellent. The ink composition of the invention may be a so-called aqueous ink containing 50% or more of water. Compared to a nonaqueous (solvent base) ink, the aqueous ink has weak reactivity, for example, to a piezoelectric element used in a recording head and an organic binder contained in a recording medium, and hence dissolution and corrosion problems are not likely to occur. In addition, in the nonaqueous (solvent base) ink, when a solvent to be used has a high boiling point and a low viscosity, there may arise a problem in that the time necessary for drying is remarkably increased. Furthermore, since the smell of the aqueous ink is reduced as compared to that of the solvent base ink, and the half or more of the aqueous ink is occupied by water, the aqueous ink is also advantageous for the environment. In addition, as the water, for example, ion-exchange water, reverse osmosis water, distilled water, or ultrapure water may be mentioned. In addition, the ink composition of the invention does not always have to include water. Although being not particularly limited, the content of the water in the ink composition is preferably in a range of 20 to 80 percent by mass and more preferably in a range of 25 to 70 percent by mass.

Printed Matter

The printed matter of the invention is obtained by applying the ink composition as described above on a print medium by an ink jet system. Accordingly, printed matter having an image excellent in gas resistance can be provided. In addition, printed matter having an image which has an excellent glitter can be provided. As the print medium to which the ink composition is applied, besides regular paper and exclusive paper having an ink receiving layer and the like, for example, base materials may be used in which regions each including a surface to which the ink composition is applied are formed of various types of plastics, ceramics, glass, metals, and composites formed therefrom.

Method for Manufacturing Printed Matter

The FIGURE is a perspective view showing a schematic structure of an ink jet apparatus (droplet ejecting apparatus). A method for manufacturing printed matter according to this embodiment has a step (droplet ejection step) of ejecting the ink composition as described above to a print medium using an ink jet apparatus (droplet ejecting apparatus) as shown in the FIGURE.

Ejection Step

Hereinafter, droplet ejection using an ink jet printer 1 as the droplet ejecting apparatus will be described. As shown in the FIGURE, the ink jet printer 1 as the droplet ejecting apparatus has a frame 2. The frame 2 is provided with a platen 3, and a print medium P is to be fed on the platen 3 by the drive of a paper feed motor 4. In addition, a guide member 5 in the form of a rod is provided for the frame 2 parallel to a longitudinal direction of the platen 3.

A carriage 6 is supported by the guide member 5 so as to be reciprocally movable in a shaft line direction thereof. The carriage 6 is connected to a carriage motor 8 via a timing belt 7 provided in the frame 2. In addition, the carriage 6 is configured to be reciprocally moved along the guide member 5 by the drive of the carriage motor 8. A droplet ejection head 9 is provided for the carriage 6, and in addition, an ink cartridge 10 for supplying ink as a liquid to the droplet ejection head 9 is detachably arranged. When a piezoelectric element (not shown) provided for the droplet ejection head 9 is driven, the ink in the ink cartridge 10 is supplied to the droplet ejection head 9 from the ink cartridge 10 and is configured to be ejected to the print medium (base material) P fed on the platen 3 from a plurality of nozzles formed in a nozzle forming surface of the droplet ejection head 9. As a result, the printed matter can be manufactured.

Heating Step

In the method for manufacturing printed matter, besides the above ejecting step, a heating step of heating a print medium to which the ink composition is applied may be performed. Since the ink composition according to the invention includes water as a dispersion medium and is rapidly dried after the ejection as described above, in general, it is not necessary to additionally provide a drying step after the ejection step. However, when the heating step is provided, even if the print medium has a high water retention, and/or the ink composition contains a low-volatile liquid component at a relatively high content (such as the case in which 3 percent by mass or more of a liquid component having a boiling point of 160° C. or more is contained), a liquid component forming the ink composition can be effectively prevented from remaining in the printed matter to be finally obtained, and the gas resistance and reliability of the printed matter can be made particularly excellent.

As described above, although the invention has been described with reference to the preferred embodiments, the invention is not limited thereto. For example, in the above embodiment, as the ink composition, although the case in which a colloid liquid is used has been typically described, a liquid other than the colloid liquid may be used instead. In addition, for example, although the piezoelectric system is used as the droplet ejecting system in the above embodiment, the droplet ejecting system, is not limited thereto, and in the invention, for example, various known techniques, such as a system in which ink is ejected using foams (bubbles) generated by heating the ink, may also be used. In addition, in the above embodiment, although it has been described that the ink composition is ejected by an ink jet system, the ink composition may also be applied to another printing system.

Example A

Hereinafter, concrete examples of the invention will be described.

1. Preparation of Ink Composition

Example 1

Polyvinyl pyrrolidone (PVP, weight average molecular weight: 10,000) was heated at 70° C. for 15 hours and was then cooled to room temperature. This PVP in an amount of 1,000 g was added to 500 ml of an ethylene glycol solution to prepare a PVP solution. In a separate container, 500 ml of ethylene glycol was received, and after 128 g of silver nitrate was added, stirring was sufficiently performed by an electromagnetic stirrer to prepare a silver nitrate solution. While the PVP solution was stirred at 120° C. using an overhead mixer, the silver nitrate solution was added to perform a reaction for approximately 80 minutes by heating. Subsequently, the mixed solution thus obtained was cooled to room temperature. Centrifugal separation was performed for the solution thus obtained for 10 minutes at 2,200 rpm by a centrifugal machine. Next, silver particles thus separated were recovered, and in order to remove excess PVP, 500 ml of an ethanol solution was further added. In addition, centrifugal separation was further performed, and the silver particles were recovered. Furthermore, the silver particles thus recovered were dried at 35° C. and 1.3 Pa by a vacuum dryer.

The silver particles manufactured as described above, HALLODEX (manufactured by Hayashibara Co., Ltd.), triethylene glycol monobutyl ether, triethanolamine, an emulsion wax (AQUACER 539 (manufactured by BYK-Chemie)), Olfine E1010 (manufactured by Nissin Chemical Industry Co., Ltd.), and ion-exchange water were mixed together to form an ink composition. Incidentally, HALLODEX contains 2 percent by mass of a monosaccharide and 78.3 percent by mass of at least one of a tetrasaccharide and a higher saccharide and is a mixed sugar containing maltosyl-trehalose as a trehalose derivative. In addition, the mean particle diameter of the silver particles was measured using "Microtrack UPA" (manufactured by Nikkiso Co., Ltd.), and as the measurement conditions, the refractive index was set to 0.2-3.9 i, the refractive index of the solvent (water) was set to 1.333, and the measurement particle shape was set to a sphere.

Examples 2 to 7

Ink compositions were prepared in a manner similar to that of Example 1 except that the types of components and the amounts thereof used for the preparation were adjusted to have compositions as shown in Table 1.

Comparative Examples 1 to 3

Ink compositions were prepared in a manner similar to that of Example 1 except that the types of components and the amounts thereof used for the preparation were adjusted to have compositions as shown in Table 1.

The ink composition of each of Examples and Comparative Examples is shown in Table 1. In addition, in Table 1, Olfine E1010, glycerol, HALLODEX, HS-20 (reduction starch sugar product, manufactured by Hayashibara Co., Ltd.), HS-300 (reduction starch sugar product, manufactured by Hayashibara Co., Ltd.), HS-500 (reduction starch sugar product, manufactured by Hayashibara Co., Ltd.), triethylene glycol monobutyl ether, trimethylolpropane, triethanolamine, and polyethylene glycol 2000 are represented by E1010, GR, HAL, HS20, HS300, HS500, TG, TMP, TEA, and PEG2000, respectively. In addition, the viscosities (each at 25° C. measured in accordance with JIS Z8809 using a vibration type viscometer) of the ink compositions of Examples and Comparative Examples were all in a range of 5.0 to 10.0 mPa·s. HS-20 contains 2 to 4 percent by mass of a monosaccharide and 75 to 80 percent by mass of at least one of a tetrasaccharide and a higher saccharide, HS-300 contains 20 to 25 percent by mass of a monosaccharide and 13 to 18 percent by mass of at least one of a tetrasaccharide and a higher saccharide, and HS-500 contains 37 to 43 percent by mass of a monosaccharide and 12 to 19 percent by mass of at least one of a tetrasaccharide and a higher saccharide.

In addition, the maximum particle diameter of the silver particles used for Examples 1 to 7 and Comparative Examples 1 to 3 was 92 nm, and the content of silver particles having a particle diameter of 150 nm or more on a volume basis was 0.1 percent by mass or less (0 percent by mass in this embodiment). The composition A for obtaining the equilibrium moisture content was formed by drying the ink composition of each of Examples and Comparative Examples in a nitrogen atmosphere at a temperature of 70° C. and a relative humidity (RH) of 0% for 24 hours to remove all moisture.

In addition, the equilibrium moisture content was calculated by the following method. First, 4 g of each composition A was dripped in a glass petri dish having an inside diameter of 80 mm and was held for 48 hours in a constant temperature and humidity oven in which an ambient temperature of 23° C. and a relative humidity (RH) of 50% or an ambient temperature of 23° C. and a relative humidity (RH) of 75% were maintained. Although the change in mass was not observed when the composition A was held in the constant temperature and humidity oven for approximately 24 hours, in order to perform more accurate measurement in this case, the composition A was held for 48 hours. The weight after the composition A was held as described above was measured using a precision balance, and the equilibrium moisture content was calculated from the change in mass before and after the holding. The weight of the sample was measured using "METTLLER AT460" (supplied by Sibel Kikai K.K.).

TABLE 1

| | Ag PARTICLES | | | SUGAR | | TMP | | PEG2000 |
| | MEAN PARTICLE DIAMETER [nm] | CONTENT (PERCENT BY MASS) | TG CONTENT (PERCENT BY MASS) | TYPE | CONTENT (PERCENT BY MASS) | CONTENT (PERCENT BY MASS) | GR | CONTENT (PERCENT BY MASS) |
| --- | --- | --- | --- | --- | --- | --- | --- | --- |
| EXAMPLE 1 | 46.5 | 8 | 3 | HAL | 20 | — | — | — |
| EXAMPLE 2 | 46.5 | 8 | 3 | HAL | 18 | 6 | — | — |
| EXAMPLE 3 | 46.5 | 8 | 3 | HS500 | 18 | 6 | — | — |
| EXAMPLE 4 | 46.5 | 8 | 3 | HS300 | 25 | 6 | — | — |
| EXAMPLE 5 | 46.5 | 8 | 3 | HS20 | 15 | 6 | — | — |
| EXAMPLE 6 | 46.5 | 8 | 3 | HAL | 5 | 10.5 | — | — |
| EXAMPLE 7 | 46.5 | 10 | — | — | — | 4 | — | 4 |
| COMPARATIVE EXAMPLE 1 | 46.5 | 8 | 3 | — | — | 3 | — | 4 |
| COMPARATIVE EXAMPLE 2 | 46.5 | 8 | 3 | — | — | 4 | 12 | — |
| COMPARATIVE EXAMPLE 3 | 46.5 | 8 | — | — | — | — | — | — |

TABLE 1-continued

| | E1010 | TEA CONTENT (PERCENT BY MASS) | WAX CONTENT (PERCENT BY MASS) | MOISTURE CONTENT (PERCENT BY MASS) | EQUILIBRIUM MOISTURE CONTENT AT 23° C. AND 50% RH (PERCENT BY MASS) | EQUILIBRIUM MOISTURE CONTENT AT 23° C. AND 70% RH (PERCENT BY MASS) |
|---|---|---|---|---|---|---|
| EXAMPLE 1 | 0.5 | 0.3 | 0.1 | BALANCE | 2.64 | 4.48 |
| EXAMPLE 2 | 0.5 | 0.3 | 0.1 | BALANCE | 3.3 | 6.63 |
| EXAMPLE 3 | 0.5 | 0.3 | 0.1 | BALANCE | 5.87 | 11.92 |
| EXAMPLE 4 | 0.5 | 0.3 | 0.1 | BALANCE | 3.57 | 10.27 |
| EXAMPLE 5 | 0.5 | 0.3 | 0.1 | BALANCE | 6.1 | 12.35 |
| EXAMPLE 6 | 0.5 | 0.3 | 0.1 | BALANCE | 6.9 | 15.87 |
| EXAMPLE 7 | 0.5 | 0.3 | 0.1 | BALANCE | 7.8 | 14.85 |
| COMPARATIVE EXAMPLE 1 | 0.5 | 0.3 | 0.1 | BALANCE | 9.72 | 21.83 |
| COMPARATIVE EXAMPLE 2 | 0.5 | 0.3 | 0.1 | BALANCE | 17.39 | 33.04 |
| COMPARATIVE EXAMPLE 3 | 0.5 | 0.3 | — | BALANCE | 0.93 | 1.59 |

2. Manufacturing of Printed Matter

In each of Examples and Comparative Examples, printed matter was manufactured as described below using the ink composition. First, ink jet exclusive paper (photograph paper) as a print medium, photograph paper <gloss> (manufactured by Seiko Epson Corp.), was prepared.

By using PX-G930 (manufactured by Seiko Epson Corp.), the ink composition was applied to a surface of this print medium on which an ink receiving layer was provided to form a predetermined pattern at a duty of 40%. Accordingly, the printed matter was obtained. In this specification, the "duty" is a value calculated by the following formula. Duty (%)=100×(number of dots actually printed/(vertical resolution×horizontal resolution)) (In the Formula, the "number of dots actually printed" is the number of dots actually printed per unit area, and the "vertical resolution" and the "horizontal resolution" are each a resolution per unit area.)

3. Evaluation

3.1 Evaluation of Head Clogging

After the ink composition of each of Examples and Comparative Examples was filled in PX-G930 (manufactured by Seiko Epson Corp.) and was held at ordinary temperature for 24 hours, the clogging was evaluated in accordance with the following criteria.
A: no nozzle clogging occurs.
B: nozzle clogging occurs.

3.2 Glossiness (Initial Value)

The glossiness by specular reflection at an angle of 60° of a printing surface immediately after the formation of the printed matter according to each of Examples and Comparative Examples was measured using a gloss meter (MINOLTA MULTI GLOSS 268).

3.3 Evaluation of Gas Resistance

A gas resistance test was performed using "Ozone Weather Meter OMS-H" (trade name, manufactured by Suga Test Instruments Co., Ltd.) in such a way that the printed matter of each of Examples and Comparative Examples was exposed to ozone for 16 hours under the conditions in which the temperature was 23.0° C., the relative humidity (RH) was 50%, and an ozone concentration was 5 ppm. The glossiness by specular reflection at an angle of 60° of the printed matter thus exposed to ozone was measured using a gloss meter (MINOLTA MULTI GLOSS 268), and the reduction rate from the initial value was obtained and was evaluated in accordance with the following criteria.
A: Reduction rate is less than 8%.
B: Reduction rate is in a range of 8% to less than 16%.
C: Reduction rate is in a range of 16% to less than 24%.
D: Reduction rate is 24% or more.
These results are shown in Table 2.

TABLE 2

| | EVALUATION OF CLOGGING | GLOSSINESS AT 60° INITIAL VALUE | GAS RESISTANCE GLOSSINESS AT 60° AFTER OZONE EXPOSURE | REDUCTION RATE [%] | EVALUATION |
|---|---|---|---|---|---|
| EXAMPLE 1 | A | 536 | 537 | 0 | A |
| EXAMPLE 2 | A | 570 | 550 | 3.5 | A |
| EXAMPLE 3 | A | 574 | 460 | 19.8 | C |
| EXAMPLE 4 | A | 567 | 537 | 5.3 | A |
| EXAMPLE 5 | A | 537 | 487 | 9.3 | B |
| EXAMPLE 6 | A | 525 | 423 | 19.4 | C |
| EXAMPLE 7 | A | 562 | 441 | 21.5 | C |
| COMPARATIVE EXAMPLE 1 | A | 563 | 293 | 48 | D |

TABLE 2-continued

| | EVALUATION OF CLOGGING | GLOSSINESS AT 60° INITIAL VALUE | GAS RESISTANCE | | |
|---|---|---|---|---|---|
| | | | GLOSSINESS AT 60° AFTER OZONE EXPOSURE | REDUCTION RATE [%] | EVALUATION |
| COMPARATIVE EXAMPLE 2 | A | 506 | 172 | 66.5 | D |
| COMPARATIVE EXAMPLE 3 | B | 543 | 543 | 0 | A |

As apparent from Table 2, the ink composition according to the invention was excellent in ejection stability. In addition, the printed matter obtained using the ink according to the invention was excellent in gas resistance. On the other hand, satisfactory results were not obtained in Comparative Examples.

Example B

Next, concrete examples of the invention will be described.

1. Preparation of Ink Composition

Example B1

Polyvinyl pyrrolidone (PVP, weight average molecular weight: 10,000) was heated at 70° C. for 15 hours and was then cooled to room temperature. This PVP in an amount of 1,000 g was added to 500 ml of an ethylene glycol solution to prepare a PVP solution. In a separate container, 500 ml of ethylene glycol was received, and after 128 g of silver nitrate was added, stirring was sufficiently performed by an electromagnetic stirrer to prepare a silver nitrate solution. While the PVP solution was stirred at 120° C. using an overhead mixer, the silver nitrate solution was added to perform a reaction for approximately 80 minutes by heating. Subsequently, the mixed solution thus obtained was cooled to room temperature. Centrifugal separation was performed for the solution thus obtained for 10 minutes at 2,200 rpm by a centrifugal machine. Next, silver particles thus separated were recovered, and in order to remove excess PVP, 500 ml of an ethanol solution was further added. In addition, centrifugal separation was further performed, and the silver particles were recovered. Furthermore, the silver particles thus recovered were dried at 35° C. and 1.3 Pa by a vacuum dryer. The silver particles manufactured as described above, HALLODEX (manufactured by Hayashibara Co., Ltd.), 1,2-hexanediol, triethanolamine, an emulsion wax (AQUACER 539 (manufactured by BYK-Chemie)), Olfine E1010 (manufactured by Nissin Chemical Industry Co., Ltd.), and ion-exchange water were mixed together to form an ink composition.

Examples B2 to B11

Ink compositions were prepared in a manner similar to that of Example B1 except that the types of components and the amounts thereof used for the preparation were adjusted to have compositions as shown in Table 3.

Comparative Examples B1 to B7

Ink compositions were prepared in a manner similar to that of Example B1 except that the types of components and the amounts thereof used for the preparation were adjusted to have compositions as shown in Table 3.

The ink composition of each of Examples and Comparative Examples is shown in Table 3. In addition, in Table 3, Olfine E1010, HALLODEX, HS-30 (reduction starch sugar product, manufactured by Hayashibara Co., Ltd.), HS-60 (reduction starch sugar product, manufactured by Hayashibara Co., Ltd.), HS-20 (reduction starch sugar product, manufactured by Hayashibara Co., Ltd.), HS-500 (reduction starch sugar product, manufactured by Hayashibara Co., Ltd.), trimethylolpropane, triethanolamine, 1,2-hexanediol, polyethylene glycol 200, polyethylene glycol 1000, and polyethylene glycol 2000 are represented by E1010, HAL, HS30, HS60, HS20, HS500, TMP, TEA, HD, PEG200, PEG1000, and PEG2000, respectively. In addition, the viscosities (each at 25° C. measured in accordance with JIS Z8809 using a vibration type viscometer) of the ink compositions of Examples and Comparative Examples were all in a range of 5.0 to 10.0 mPa·s. In addition, the mean particle diameter of the silver particles was measured using "Microtrack UPA" (manufactured by Nikkiso Co., Ltd.), and as the measurement conditions, when the refractive index was set to 0.2 to 3.9 i, the refractive index of the solvent (water) was set to 1.333, and the measurement particle shape was set to a sphere,ced mean particle diameter was 45 nm.

TABLE 3

| | CONTENT OF SILVER PARTICLES (PERCENT BY MASS) | SUGAR | | POLYALCOHOL | | TMP CONTENT (PERCENT BY MASS) | E1010 | TEA CONTENT (PERCENT BY MASS) |
|---|---|---|---|---|---|---|---|---|
| | | TYPE | CONTENT (PERCENT BY MASS) | TYPE | CONTENT (PERCENT BY MASS) | | | |
| EXAMPLE B1 | 8 | HAL | 20 | HD | 3 | — | 0.5 | 0.3 |
| EXAMPLE B2 | 8 | HAL | 15 | HD | 3 | 3.5 | 0.5 | 0.3 |
| EXAMPLE B3 | 8 | HAL | 10 | HD | 3 | 7 | 0.5 | 0.3 |
| EXAMPLE B4 | 8 | HAL | 5 | HD | 3 | 10.5 | 0.5 | 0.3 |
| EXAMPLE B5 | 8 | HAL | 2 | HD | 3 | 10.5 | 0.5 | 0.3 |
| EXAMPLE B6 | 8 | HAL | 25 | HD | 3 | — | 0.5 | 0.3 |
| EXAMPLE B7 | 8 | HAL | 30 | HD | 3 | — | 0.5 | 0.3 |

TABLE 3-continued

| | | | | | | | | |
|---|---|---|---|---|---|---|---|---|
| EXAMPLE B8 | 8 | HS20 | 15 | HD | 3 | 3.5 | 0.5 | 0.3 |
| EXAMPLE B9 | 8 | HS30 | 15 | HD | 3 | 3.5 | 0.5 | 0.3 |
| EXAMPLE B10 | 8 | HS60 | 15 | HD | 3 | 3.5 | 0.5 | 0.3 |
| EXAMPLE B11 | 8 | HS500 | 15 | HD | 3 | 3.5 | 0.5 | 0.3 |
| COMPARATIVE EXAMPLE B1 | 8 | — | — | HD | 3 | 14 | 0.5 | 0.3 |
| COMPARATIVE EXAMPLE B2 | 10 | — | — | HD | 3 | 10.5 | 0.5 | 0.3 |
| COMPARATIVE EXAMPLE B3 | 8 | — | — | HD | 3 | 7 | 0.5 | 0.3 |
| COMPARATIVE EXAMPLE B4 | 8 | — | — | HD | 3 | 3.5 | 0.5 | 0.3 |
| COMPARATIVE EXAMPLE B5 | 8 | — | — | HD/PEG200 | 3/11.5 | 3.5 | 0.5 | 0.3 |
| COMPARATIVE EXAMPLE B6 | 8 | — | — | HD/PEG1000 | 3/9.5 | 3.5 | 0.5 | 0.3 |
| COMPARATIVE EXAMPLE B7 | 8 | — | — | HD/PEG2000 | 3/3.3 | 3.5 | 0.5 | 0.3 |

| | WAX CONTENT (PERCENT BY MASS) | MOISTURE CONTENT (PERCENT BY MASS) | CONTENT OF MONOSACCHARIDE OF SUGARS (PERCENT BY MASS) | CONTENT OF TETRASACCHARIDE OR HIGHER SACCHARIDE OF SUGARS (PERCENT BY MASS) |
|---|---|---|---|---|
| EXAMPLE B1 | 0.1 | BALANCE | 2 | 78.3 |
| EXAMPLE B2 | 0.1 | BALANCE | 2 | 78.3 |
| EXAMPLE B3 | 0.1 | BALANCE | 2 | 78.3 |
| EXAMPLE B4 | 0.1 | BALANCE | 2 | 78.3 |
| EXAMPLE B5 | — | BALANCE | 2 | 78.3 |
| EXAMPLE B6 | — | BALANCE | 2 | 78.3 |
| EXAMPLE B7 | — | BALANCE | 2 | 78.3 |
| EXAMPLE B8 | — | BALANCE | 2 to 4 | 75 to 80 |
| EXAMPLE B9 | — | BALANCE | 4 to 6 | 60 to 65 |
| EXAMPLE B10 | — | BALANCE | 2 to 4 | 11 to 15 |
| EXAMPLE B11 | — | BALANCE | 37 to 43 | 12 to 19 |
| COMPARATIVE EXAMPLE B1 | 0.1 | BALANCE | — | — |
| COMPARATIVE EXAMPLE B2 | 0.1 | BALANCE | — | — |
| COMPARATIVE EXAMPLE B3 | 0.1 | BALANCE | — | — |
| COMPARATIVE EXAMPLE B4 | 0.1 | BALANCE | — | — |
| COMPARATIVE EXAMPLE B5 | — | BALANCE | — | — |
| COMPARATIVE EXAMPLE B6 | — | BALANCE | — | — |
| COMPARATIVE EXAMPLE B7 | — | BALANCE | — | — |

2. Manufacturing of Printed Matter

In each of Examples and Comparative Examples, printed matter was manufactured as described below using the ink composition. First, ink jet exclusive paper (photograph paper) as a print medium, photograph paper <gloss> (manufactured by Seiko Epson Corp.), was prepared.

By using PX-G930 (manufactured by Seiko Epson Corp.), the ink composition was applied to a surface of this print medium on which an ink receiving layer was provided to form a predetermined pattern at a duty of 40%. Accordingly, the printed matter was obtained. In this specification, the "duty" is a value calculated by the following formula. Duty (%)=100×(number of dots actually printed/(vertical resolution×horizontal resolution)) (In the Formula, the "number of dots actually printed" is the number of dots actually printed per unit area, and the "vertical resolution" and the "horizontal resolution" are each a resolution per unit area.)

3. Evaluation 3.1 Evaluation of Head Clogging

After the ink composition of each of Examples and Comparative Examples was filled in PX-G930 (manufactured by Seiko Epson Corp.), the clogging was evaluated in accordance with the following criteria.

A: no nozzle clogging occurs even after the ink composition is held at ordinary temperature for one month or more.

B: Although clogging occurs when the ink composition is held at ordinary temperature for two weeks, the clogging is eliminated by cleaning.

C: Although clogging occurs when the ink composition is held at ordinary temperature for one week, the clogging is eliminated by cleaning.

D: Clogging occurs when the ink composition is held at ordinary temperature for three days, and the clogging is not eliminated by cleaning.

3.2 Glossiness (Initial Value)

The glossiness by specular reflection at an angle of 60° of a printing surface immediately after the formation of the printed matter according to each of Examples and Comparative Examples was measured using a gloss meter (MINOLTA MULTI GLOSS 268).

3.3 Evaluation of Gas Resistance

A gas resistance test was performed using "Ozone Weather Meter OMS-H" (trade name manufactured by Suga Test Instruments Co., Ltd.) in such a way that the printed matter of each of Examples and Comparative Examples was exposed to ozone for 16 hours under conditions in which the temperature was 23.0° C., the relative humidity (RH) was 50%, and an ozone concentration was 5 ppm. The glossiness by specular reflection at an angle of 60° of the printed matter thus exposed to ozone was measured using a gloss meter (MINOLTA MULTI GLOSS 268), and the reduction rate from the initial value was obtained and was evaluated in accordance with the following criteria.
A: Reduction rate is less than 8%.
B: Reduction rate is in a range of 8% to less than 16%.
C: Reduction rate is in a range of 16% to less than 26%.
D: Reduction rate is 26% or more.
These results are shown in Table 4.

TABLE 4

|  | EVALUATION OF CLOGGING | GLOSSINESS AT 60° INITIAL VALUE | GAS RESISTANCE | | |
|---|---|---|---|---|---|
|  |  |  | GLOSSINESS AT 60° AFTER OZONE EXPOSURE | REDUCTION RATE [%] | EVALUATION |
| EXAMPLE B1 | B | 536 | 540 | −4.2 | A |
| EXAMPLE B2 | B | 529 | 461 | 5.4 | A |
| EXAMPLE B3 | A | 523 | 452 | 15.7 | B |
| EXAMPLE B4 | A | 523 | 433 | 23.6 | C |
| EXAMPLE B5 | A | 518 | 386 | 25.5 | D |
| EXAMPLE B6 | C | 518 | 386 | 25.5 | A |
| EXAMPLE B7 | D | 541 | 526 | 2.8 | A |
| EXAMPLE B8 | B | 506 | 417 | 14 | B |
| EXAMPLE B9 | B | 524 | 453 | 15.6 | B |
| EXAMPLE B10 | B | 529 | 444 | 17.1 | C |
| EXAMPLE B11 | A | 526 | 421 | 22 | C |
| COMPARATIVE EXAMPLE B1 | A | 523 | 392 | 38.4 | D |
| COMPARATIVE EXAMPLE B2 | A | 523 | 393 | 38.1 | D |
| COMPARATIVE EXAMPLE B3 | A | 529 | 413 | 37.7 | D |
| COMPARATIVE EXAMPLE B4 | B | 528 | 421 | 35.8 | D |
| COMPARATIVE EXAMPLE B5 | A | 529 | 311 | 44.7 | D |
| COMPARATIVE EXAMPLE B6 | C | 528 | 376 | 36.7 | D |
| COMPARATIVE EXAMPLE B7 | D | 537 | 442 | 27.2 | D |

As apparent from Table 4, the ink composition according to the invention was excellent in ejection stability, and the generation of clogging was also preferably suppressed. In addition, the printed matter obtained using the ink according to the invention was excellent in gas resistance. On the other hand, satisfactory results were not obtained in Comparative Examples.

What is claimed is:
1. An ink composition to be ejected by an ink jet forming image system, comprising:
non-microencapsulated silver particles; and
water,
wherein when a composition formed of components of the ink composition other than the water is held in an atmosphere at an ambient temperature of 23° C. and a relative humidity (RH) of 50%, the equilibrium moisture content of the composition is in a range of 2 to 7.8 percent by mass, and
wherein the mean particle diameter d90 in a grain size accumulation curve of the non-microencapsulated silver particles is in a range of 10 nm to 100 nm, and wherein the silver particles do not contain 0.1 percent by mass or more of particles having a particle diameter of 150 nm or more on a volume basis,
wherein the initial glossiness at 60° is at least 525 and the glossiness at 60° after O-Zone exposure is at least 423.
2. The ink composition according to claim 1, wherein when the composition formed of components of the ink composition other than the water is held in an atmosphere at an ambient temperature of 23° C. and a relative humidity (RH) of 70%, the equilibrium moisture content of the composition is in a range of 4 to 15.9 percent by mass.
3. The ink composition according to claim 1, wherein the mean particle diameter of the silver particles is in a range of 5 to 100 nm.
4. The ink composition according to claim 1, further comprising a saccharide.
5. The ink composition according to claim 1, further comprising a plurality of types of saccharides.
6. The ink composition according to claim 5, wherein the plurality of types of saccharides contains 45% or less of a monosaccharide and 10% or more of at least one of a tetrasaccharide and a higher saccharide.

7. The ink composition according to claim 4, wherein the saccharide includes maltosyltrehalose.

8. A printing apparatus applying the ink composition according to claim 1 on a print medium by an ink jet system.

9. Printed matter obtained by applying the ink composition according to claim 1 on a print medium by an ink jet system.

10. The ink composition according to claim 4, wherein the saccharide is a trehalose derivative.

11. An ink composition to be ejected by an ink jet forming image system, comprising:
non-microencapsulated silver particles; and
water,
wherein when a composition formed of components of the ink composition other than the water is held in an atmosphere at an ambient temperature of 23° C. and a relative humidity (RH) of 50%, the equilibrium moisture content of the composition is in a range of 2 to 7.8 percent by mass, and wherein the mean particle diameter d90 in a grain size accumulation curve of the non-microencapsulated silver particles is in a range of 2 nm to 20 nm,
wherein the initial glossiness at 60° is at least 525 and the glossiness at 60° after O-Zone exposure is at least 423.

12. The ink composition according to claim 1, wherein the ink composition has a glossiness reduction rate of less than 26%.

13. The ink composition according to claim 1, further comprising an alkanediol having 4 to 8 carbon atoms.

14. The ink composition according to claim 1, further comprising trimethylolpropane.

15. The ink composition according to claim 11, wherein the ink composition has a glossiness reduction rate of less than 26%.

16. The ink composition according to claim 11, further comprising an alkanediol having 4 to 8 carbon atoms.

17. The ink composition according to claim 11, further comprising trimethylolpropane.

* * * * *